US010050551B1

(12) United States Patent
Kalluri et al.

(10) Patent No.: US 10,050,551 B1
(45) Date of Patent: Aug. 14, 2018

(54) ARRANGEMENT, METHOD AND COMPUTER PROGRAM PRODUCT FOR LIMITING CIRCULATING CURRENTS

(71) Applicant: ABB SCHWEIZ AG, Baden (CH)

(72) Inventors: Sri Ramya Kalluri, Secunderabad (IN); Gaurav-Kumar Kasal, Västerås (SE); Ying Jiang-Häfner, Ludvika (SE); Jürgen Häfner, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/742,733

(22) PCT Filed: Jul. 28, 2015

(86) PCT No.: PCT/EP2015/067265
§ 371 (c)(1),
(2) Date: Jan. 8, 2018

(87) PCT Pub. No.: WO2017/016594
PCT Pub. Date: Feb. 2, 2017

(51) Int. Cl.
*H02M 7/04* (2006.01)
*H02M 7/12* (2006.01)
*H02J 3/36* (2006.01)

(52) U.S. Cl.
CPC ................ *H02M 7/12* (2013.01); *H02J 3/36* (2013.01); *H02J 2003/365* (2013.01)

(58) Field of Classification Search
CPC ........ H02M 1/12; H02M 1/4208; H02M 1/15; H02M 1/32; H02M 3/1584; H02M 3/285;
(Continued)

(56) References Cited

U.S. PATENT DOCUMENTS 6,125,045 A * 9/2000 Nishikawa .......... H02M 5/4505 363/37
7,564,703 B1 * 7/2009 Braun .................. H02M 7/493 363/34
(Continued)

FOREIGN PATENT DOCUMENTS

GB 1147146 4/1969
WO WO 2007/028350 A1 3/2007
WO WO 2014/162620 A1 10/2014

OTHER PUBLICATIONS

International Preliminary Report on Patentability, issued in PCT/EP2015/067265, dated Nov. 27, 2017.
(Continued)

*Primary Examiner* — Adolf Berhane
(74) *Attorney, Agent, or Firm* — Birch, Stewart, Kolasch & Birch, LLP

(57) ABSTRACT

An arrangement, method and computer program product are provided for limiting circulating currents in a converter converting between AC and DC. The converter has a number of AC and DC terminals and includes a number of converter arms, where a first and a second converter arm are connected in parallel between a first DC terminal and a first AC terminal. Each converter arm includes a string of series-connected converter cells. The arrangement includes a control unit that obtains a current of the first converter arm and a current of the second converter arm, forms an average of the two converter arm currents, forms a first and a second voltage control signal based on the average and uses the first and second voltage control signal in the control of the voltage provided by the first and second converter arm.

16 Claims, 3 Drawing Sheets

10
20
P1
22
16
18
P2
12
14

(58) Field of Classification Search
CPC .......... H02M 7/153; H02M 3/10; H02M 7/00; H02M 7/04; H02M 7/217; H02M 7/219; H02H 7/125
USPC ... 363/39, 44, 45, 52, 65, 67, 123, 125, 127
See application file for complete search history.

(56) References Cited

U.S. PATENT DOCUMENTS

| | | | | |
|---|---|---|---|---|
| 9,722,502 | B2 * | 8/2017 | Steimer | H02M 5/44 |
| 9,853,450 | B2 * | 12/2017 | Humphrey | H02J 3/16 |
| 2005/0162792 | A1 | 7/2005 | Wang et al. | |
| 2008/0252142 | A1 | 10/2008 | Davies et al. | |
| 2013/0208519 | A1 | 8/2013 | Yamamoto et al. | |
| 2014/0103887 | A1 | 4/2014 | Akagi et al. | |
| 2014/0226373 | A1 | 8/2014 | Park et al. | |
| 2015/0340867 | A1 * | 11/2015 | Humphrey | H02J 1/102<br>307/31 |
| 2016/0172991 | A1 * | 6/2016 | Steimer | H02M 5/293<br>363/35 |
| 2018/0069429 | A1 * | 3/2018 | Marbach | H02J 7/345 |

OTHER PUBLICATIONS

International Search Report, issued in PCT/EP2015/067265, dated May 2, 2016.

Panov et al., "Loop Gain Measurement of Paralleled Dc-Dc Converters With Average-Current-Sharing Control", Applied Power Electronics Conference and Exposition, 2008. APEC 2008, Twenty-Third Annual IEEE, Piscataway, NJ, USA, Feb. 24, 2008,pp. 1048-1053.

Pou et al., "Control Strategy to Balance Operation of Parallel Connected Legs of Modular Multilevel Converters", Industrial Electronics (ISIE), 2013 IEEE International Symposium, May 28-31, 2013, 7 pages.

Tu et al., "Circulating Current Suppressing Controller in Modular Multilevel Converter", IEEE, 2010, 5 pages.

Written Opinion of the International Preliminary Examining Authority, issued in PCT/EP2015/067265, dated Jul. 19, 2017.

Written Opinion of the International Searching Authority, issued in PCT/EP2015/067265, dated May 2, 2016.

* cited by examiner

ARRANGEMENT, METHOD AND COMPUTER PROGRAM PRODUCT FOR LIMITING CIRCULATING CURRENTS

FIELD OF INVENTION

The present invention generally relates to voltage source converters. More particularly the present invention relates to an arrangement, method and computer program product for limiting circulating currents of converters.

BACKGROUND

Direct Current (DC) power transmission systems are of interest to use in various situations, for instance when transferring electrical power over long distances.

High Voltage Direct Current (HVDC) transmission of power has proved to be an efficient alternative to Alternating Current (AC) transmission in many power transmission situations. Several HVDC transmission lines may furthermore be interconnected to form an HVDC transmission network.

These power systems are typically equipped with converters for converting between AC and DC. Furthermore, in these systems the power levels keep getting higher.

With the increase in the power levels being transmitted over HVDC systems, a need to enhance the power rating of the HVDC converters has arisen. This can be achieved by increasing the voltage or current levels of the converter. However, semiconductor devices used in the converter are often being operated at their maximum voltage and current limits.

Another way of increasing the power rating of a converter is to connect more semiconductors, arms or converters in parallel. Connecting switches in parallel needs complicated Gate Drivers with more focus on the physical circuit layout to synchronize their switching. Hence, paralleling of arms/converters is often an attractive option.

The use of a converter with parallel converter arms is described in US 2008/0252142.

One control scheme for controlling such a converter with parallel converter arms is described by Pou, Josep; Ceballos, Salvador; Konstantinou, Georgios; Capella, Gabriel J.; Agelidis, Vassilios G., in "Control strategy to balance operation of parallel connected legs of modular multilevel converters", Industrial Electronics (ISIE), 2013 IEEE International Symposium, 28-31 May 2013.

Under ideal conditions, load current should be distributed equally between both the parallel arms. However, even a small mismatch between the parameters of both the arms leads to a flow of circulating current in the converter. This current can flow between the two parallel arms, on the AC side or on the DC side of the converter. This causes an imbalance in the distribution of load current between different phases leading to additional losses or instability in the system. This is one of the important issues in paralleling of converter arms. Hence, there is a need to develop a control to limit the circulating current flowing between the parallel connected converter arms.

SUMMARY OF THE INVENTION

The present invention addresses the problem of limiting the circulating current between two parallel converter arms of a converter.

This object is according to a first aspect achieved through an arrangement for limiting circulating currents in a converter converting between alternating current, AC, and direct current, DC, the converter having a number of AC and DC terminals and comprising:

a number of converter arms, where a first and a second converter arm are connected in parallel between a first DC terminal and a first AC terminal, each converter arm comprising a string of series-connected converter cells, the arrangement comprising a control unit configured to:

obtain a current of the first converter arm and a current of the second converter arm, form an average of the two converter arm currents, form a first voltage control signal based on the average, form a second voltage control signal based on the average, use the first voltage control signal in the control of the voltage provided by the first converter arm, and use the second voltage control signal in the control of the voltage provided by the second converter arm.

The object is according to a second aspect achieved through a method for limiting circulating currents in a converter converting between alternating current, AC, and direct current, DC, the converter having a number of AC and DC terminals and comprising a number of converter arms, where a first and a second converter arm are connected in parallel between a first DC terminal and a first AC terminal, each converter arm comprising a string of series-connected converter cells, the method being performed in a control unit of a circulating current limiting arrangement and comprising:

obtaining a current of the first converter arm and a current of the second converter arm, forming an average of the two converter arm currents, forming a first voltage control signal based on the average, forming a second voltage control signal based on the average, using the first voltage control signal in the control of the voltage provided by the first converter arm, and using the second voltage control signal in the control of the voltage provided by the second converter arm.

The object is according to a third aspect achieved through a computer program product for limiting circulating currents in a converter converting between alternating current, AC, and direct current, DC, the converter having a number of AC and DC terminals and comprising a number of converter arms, where a first and a second converter arm are connected in parallel between a first DC terminal and a first AC terminal, each converter arm comprising a string of series-connected converter cells, the computer program product comprising a data carrier with computer program code configured to cause a control unit of a circulating current limiting arrangement to:

obtain a current of the first converter arm and a current of the second converter arm, form an average of the two converter arm currents, form a first voltage control signal based on the average, form a second voltage control signal based on the average, use the first voltage control signal in the control of the voltages provided by the first converter arm, and use the second voltage control signal in the control of the voltages provided by the second converter arm.

The present invention has a number of advantages. Through the control a fast limitation of the circulating current is achieved. This reduces losses in and increases the stability of the DC transmission system. Thereby also the power rating of the first converter may be increased. The use of the average of the two arm currents in the control does for instance force the two arm current to be equal. The control has a number of additional advantages. It may be implemented with only a few additional components or a few additional computer instructions. Thereby the computational burden is low. The control is also based on directly measured currents without any estimations.

BRIEF DESCRIPTION OF THE DRAWINGS

The present invention will in the following be described with reference being made to the accompanying drawings, where FIG. 1 schematically shows a DC power transmission system comprising two DC pole lines between a first and a second converter, each connected to a corresponding AC system via a transformer, FIG. 2 schematically shows contents in the first converter in FIG. 1 in more detail, where the converter includes a control unit, FIG. 3 schematically shows a control scheme used by the control unit for limiting circulating currents, FIG. 4 schematically shows a flow chart of a number of method steps being performed by the control unit, and FIG. 5 schematically shows a computer program product in the form of a data carrier comprising computer program code for implementing the control unit.

DETAILED DESCRIPTION OF THE INVENTION

In the following, a detailed description of preferred embodiments of the invention will be given.

Figure 1:
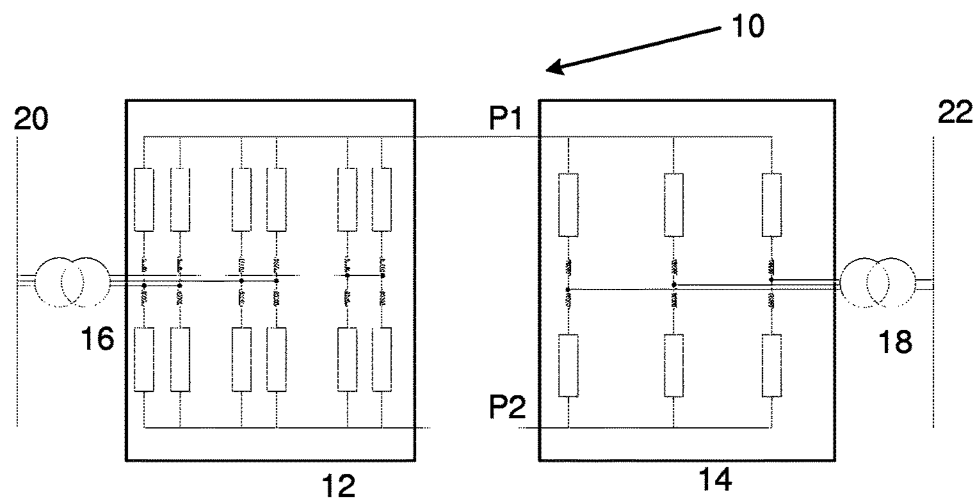

FIG. 1 shows a simplified Direct Current (DC) power transmission system 10 comprising a first converter 12 and a second converter 14, where the two converters 12 and 14 are interconnected by two DC pole lines P1 and P2. The first converter 12 is here be connected to a first alternating Current (AC) power transmission system 20 via a first transformer 16, and the second converter 14 may be connected to a second AC power transmission system 22 via a second transformer 18.

The converters 12 and 14 are both voltage source converter and more particularly multilevel converters comprising cells, i.e. voltage source converters employing cells for forming multiple voltage levels. The conversion is in this example furthermore made between DC and three-phase AC. Therefore, both converters have three phase legs, one for each phase.

In the second converter 14 each phase leg is divided into two phase arms, an upper and a lower phase arm, and at a junction where these two phase arms meet, one AC terminal is provided.

As can be seen in FIG. 1, the first converter 12 does not have the same structure. Instead there are, for each phase, two parallel converter arms between a pole and a corresponding AC terminal. The upper half of a phase leg thus comprises two parallel converter arms and the lower half of the phase leg likewise comprises two parallel converter arms. It should here be noted that also the second converter 14 could be a parallel arm converter just like the first converter 12.

Figure 2:
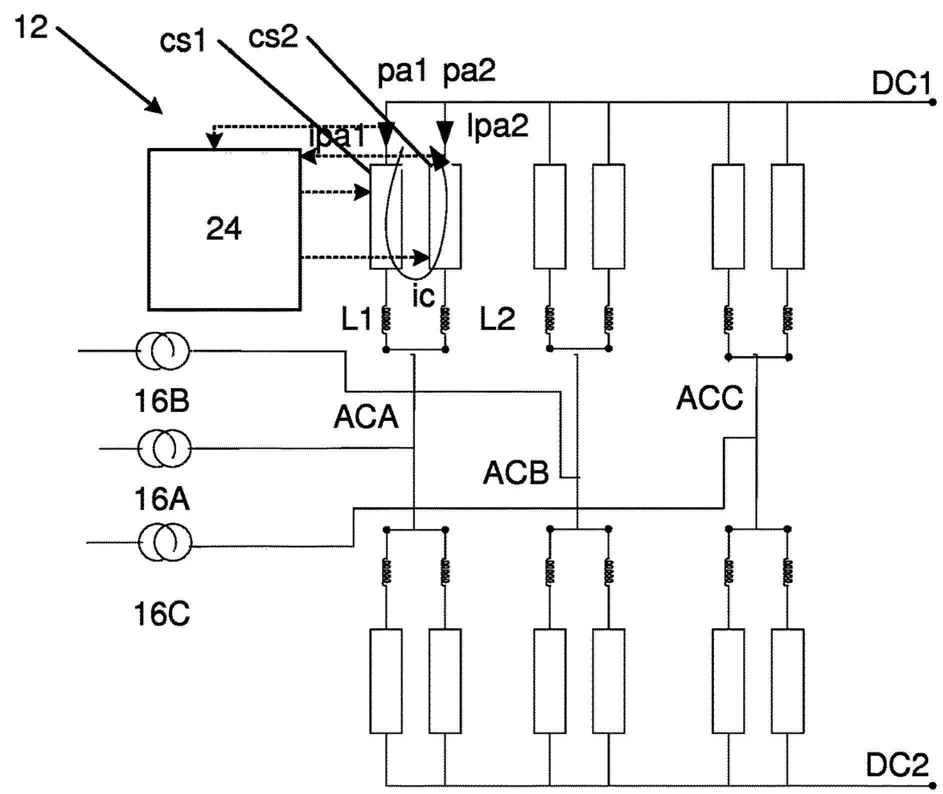

FIG. 2 schematically shows the first converter 12 in some more detail. The converter 12 has a first and a second DC terminal DC1 and DC2, which as an example are connected to the two pole lines P1 and P2. It should however be realized that one of the DC terminals, may as an alternative be connected to ground.

As can be seen each phase leg has a midpoint, where an AC terminal is provided. A first phase leg thus has a midpoint where a first AC terminal ACA for a first phase is provided, a second phase leg has a midpoint where a second AC terminal ACB for a second phase is provided and a third phase leg has a midpoint where a third AC terminal ACC for a third phase is provided. All phase legs furthermore comprise four converter arms, where two are connected in parallel between the first DC terminal DC1 and the AC terminal and two are connected in parallel between the second DC terminal DC2 and the AC terminal.

Each of the AC terminals is connected to the first AC network via a corresponding transformer 16A, 16B and 16C.

In the following description reference will only be made to a first converter arm or phase arm pa1 and a second converter arm or phase arm pa2 connected between the first DC terminal DC1 and the first AC terminal ACA, i.e. the phase arms in the upper half of the first phase leg. A converter arm may also be termed a converter valve arm. It should be realized that the aspects of the invention to be described in the following are applicable on all converter arms of the converter.

There is also shown a first converter arm current ipa1 running in the first converter arm pa1 and a second converter arm current ipa2 running in the second converter arm pa2 as well as a circulating current is circulating between the first and second converter arms pa1 and pa2.

Each converter arm comprises a string of cells. The first converter arm pa1 thus comprises a first string of converter cells cs1 and the second converter arm comprises a second string of converter cells cs2.

A cell is, as is well known-in the art, an entity comprising one or more apacitors and switches switchable to provide two or more voltage contributions, such as a positive and zero voltage contribution, a negative and a zero voltage contribution or a positive, negative and zero voltage contribution. A cell may be half-bridge cell providing two such voltage contributions or a full-bridge cell providing three such voltage contributions. It should however be realized that there may exist other types of cells providing more or other voltage contributions. The cell may furthermore comprise electronic switches, for instance Insulated Gate Bipolar Transistor (IGBT) switches or Integrated Gate-Commutated Thyristor (IGCT) switches.

There is also a control unit 24. This control unit 24 may also control the cells of the cell arm to together form a voltage varying in time on the first AC terminal ACA, which voltage together with a voltage formed through similar control of the two other converter arms connected between the first AC terminal ACA and the second DC terminal DC2 forms a wave, such as a sine wave, on the first AC terminal ACA. This control of the first and second phase arms may be carried out using a modulation reference rpa.

The control unit 24 is also shown as receiving sensor measurements from the first and second phase arms pa1 and pa2 as well as controlling the first and second cell strings cs1 and cs2.

The first and second converter arm is also shown as comprising a first and a second inductor L1 and L2.

Figure 3:
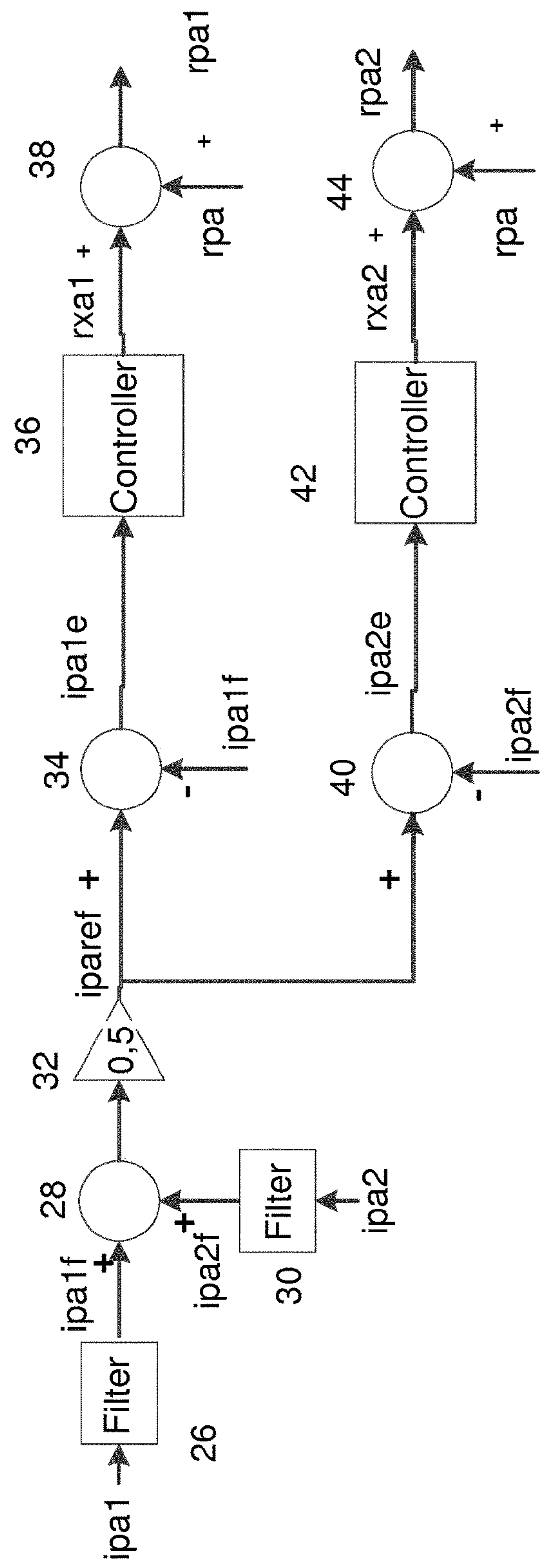

FIG. 3 shows a logic diagram of the control unit that is used for circulating current control. In the figure there is a first filter 26 having an input on which the first converter arm current ipa1 is received and an output connected to a first input of a first adding unit 28. There is also a second filter 30 having an input on which the second converter arm current ipa2 is received and an output connected to a second input of the first adding unit 28. The first adding unit 28 has an output connected to the input of a multiplying unit 32 set to multiply with 0.5, i.e. to divide by 2. The multiplying unit 32 has an output connected to a first positive input of a first subtracting unit 34 as well as to a first positive input of a second subtracting unit 40.

The first subtracting unit 34 has a second negative input on which it receives a filtered first converter arm current ipa1*f* and an output connected to the input of a first controller 36, which in turn has an output connected to a first input of a second adding unit 38. The second adding unit 38 also has a second input on which it receives the modulation reference rpa and an output on which a first converter arm control signal rpa1 is output.

The second subtracting unit 40 has a second negative input on which it receives a filtered second converter arm current ipa2*f* and an output connected to the input of a second controller 42, which in turn has an output connected to a first input of a third adding unit 44. The third adding unit 44 also has a second input on which it receives the modulation reference rpa and an output on which a second converter arm control signal rpa2 is output.

The conventional way of providing a multilevel voltage source converter is through providing the second converter shown in FIG. 1.

However, at times the power rating of such a converter is not sufficient.

Through providing two parallel converter arms between a DC terminal and a corresponding AC terminal of such a converter, the voltage rating may be increased.

However, this also leads to other problems. There may in some instances occur a mismatch between the two arm currents of two parallel converter arms, such as the first and second converter arm currents ipa1 and ipa2. This mismatch would then lead to a circulating current ic running in the converter. This current may run on the AC side as well as on the DC side. The circulating current ic causes an imbalance in the distribution of load current between the different phases, which in turn leads to additional losses and instability in the system. There is thus a need for limiting this circulating current. ic Aspects of the invention addresses this problem.

In order to address this problem there is provided a circulating current limiting arrangement comprising the control unit 24. In its simplest form the circulating current limiting arrangement only comprises the control unit 24. However, it is possible that it also comprises the first and/or second inductor L1 and L2. It is instead or additionally possible that it also comprises the entire first converter 12.

Figure 4:
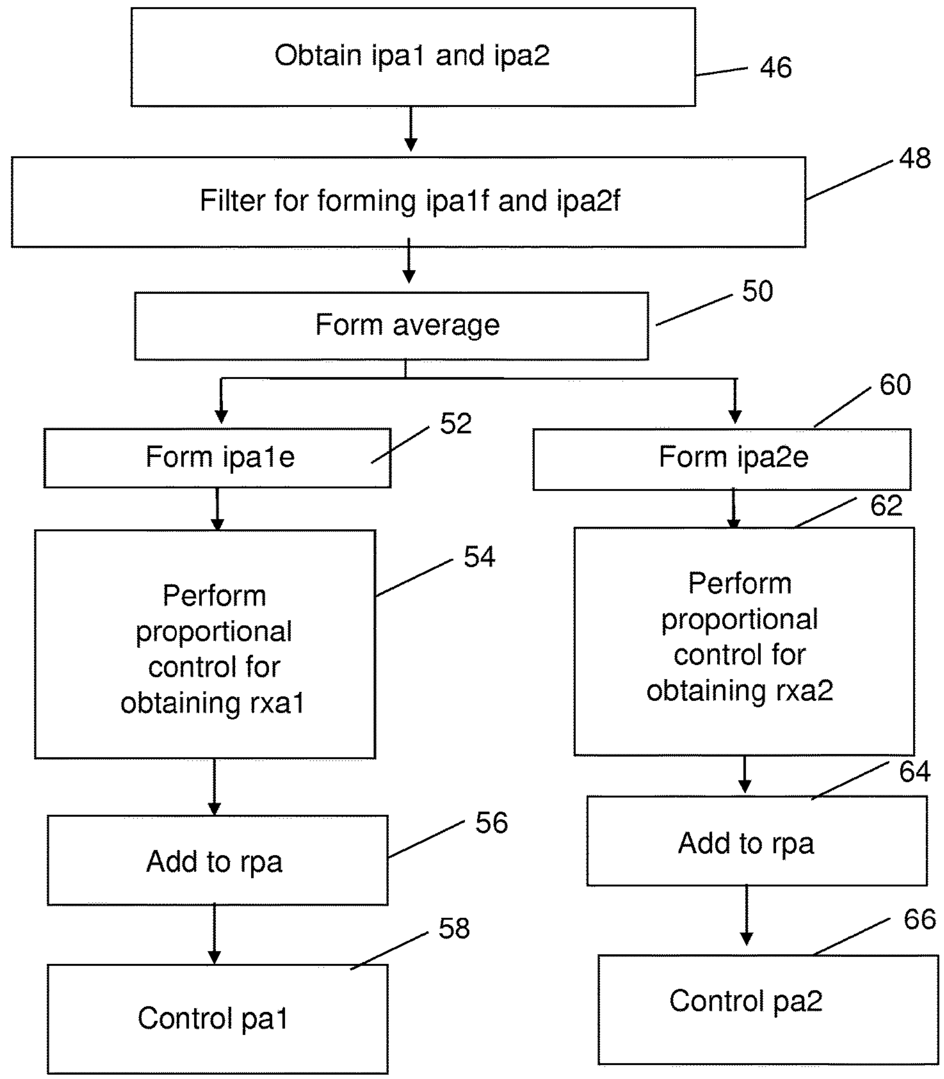

The functioning of the circulating current limiting arrangement will now also be described with reference being made to FIG. 4, which shows a flow chart of a number of method steps in a method of limiting circulating current, which method is performed by the control unit 24.

The method starts by the control unit 24 obtaining the first and second converter arm currents ipa1 and ipa2, step 46. These currents may be sensed by current sensors in the first and second converter arms pa1 and pa2 (not shown) and provided therefrom (after suitable signal conditioning) to the control unit 26, which receives the first converter arm current ipa1 on the input of the first filter 26 and the second converter arm current ipa2 on the input of the second filter 30.

The control unit 24 then filters the first and second converter arm currents in the filters 26 and 30 for obtaining a first filtered converter arm current ipa1*f* and a second filtered converter arm current ipa2, step 48. The filtering may be a low pass filtering, for instance at 40 kHz, in order to remove noise. It should be realized that this is a mere example of a suitable filter level for a created waveform with a frequency of 50 Hz.

Thereafter the control unit 24 forms an average iparef of the two currents, step 50, which in this specific case is thus an average of the two filtered currents ipa1*f* and ipa2*f*. The average is obtained through adding the filtered arm currents ipa1*f* and ipa2*f* to each other in the first adding unit 28 and thereafter dividing the sum with two or multiplying the sum with 0.5 in the multiplying unit 32. The average, which is provided as a reference signal iparef, is then supplied to the first subtracting unit 34 as well as to the second subtracting unit 40.

The control unit 24 then forms a first error signal ipa1*e*, step 52, through subtracting the first filtered current ipa1*f* from the reference signal iparef in the first subtracting unit 34. This first error signal ipa1*e* is then provided to the first controller 36. 1. The first controller 36, which may be a lead-lag controller, then performs proportional control of the first error signal ipa1*e* in order to obtain a first voltage control signal rxa1, step 54. As the first controller 36 performs proportional control, it can be seen that it may as an alternative be a proportional controller. The control may thus be carried out through the use of a proportional gain P. The first voltage control signal rxa1 is then supplied to the second adding unit 38, where it is added to the modulation reference rpa used for the first converter arm pa1 in t in order to obtain the first converter arm control signal rpa1, step 56, and thereafter the control unit 24 controls the first converter arm pa1 with the first converter arm control signal rpa1, step 58. It more particularly controls the cells of the first converter arm pa1 to provide a voltage on the AC terminal ACA corresponding to the control signal rpa1.

In an analogous manner, the control unit 24 forms a second error signal ipa2*e*, step 60, through subtracting the second filtered current ipa2*f* from the reference signal iparef in the second subtracting unit 40. This second error signal ipa2*e* is then provided to the second controller 42. The second controller 42, which may also be a lead-lag controller or a proportional controller, then performs proportional control of the second error signal ipa1*e* in order to obtain a second voltage control signal rxa2, step 62. The control may thus be carried out through the use of a proportional gain P. The second voltage control signal rxa2 is then supplied to the third adding unit 44, where it is added to the modulation reference rpa used for the second converter arm pa244 in order to obtain a second converter arm control signal rpa2, step 64. It can here be seen that the voltage reference of the second converter arm pa2 may be the same as the voltage reference of the first converter arm pa1. Thereafter the control unit 24 controls the second converter arm pa2 with the second converter arm control signal rpa2, step 66. Also here the control involves controlling the cells of the second converter arm pa2 to provide a voltage on the AC terminal ACA corresponding to the control signal rpa2.

The modulation index used above is the modulation index determined by the control unit 24 for the regular control of the cell strings. This is as such well-known, but typically involves using a modulation index that is a reference that represents the actually desired voltage provided by the first and second converter arms on the first AC terminal ACA. This desired voltage is then typically the same voltage for both the parallel converter arms. This reference for the actually desired voltage is thus modified in order to limit circulating currents. This means that if there are circulating currents and the converter arm currents thereby differ from each other, the control signals used for controlling the converter arm voltages will also differ from each other to force the currents to become equal.

Figure 5:
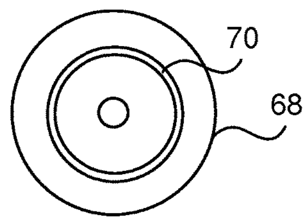

The control unit 24 may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into the control unit. One such data carrier in the form of a CD Rom disk 68 carrying computer program code 70 is shown in FIG. 5.

Through the control a fast limitation of the circulating current is achieved. This reduces losses in and increases the stability of the DC transmission system. Thereby also the power rating of the first converter may be increased. The use of the average of the two arm currents in the control does for instance force the two arm currents to be equal. The control has a number of additional advantages. It may be implemented with only a few additional components or a few additional computer instructions. Thereby the computational burden is low. Another advantage is that it is easily integrated into the existing control scheme used that is based on the modulation index. The control is also based on measured current directly without any estimations. The controller realization is furthermore simple.

Another advantage is that the control can be realized in the instantaneous three-phase frame (50 Hz). Thereby the use of any dq frame is avoided, which helps in the simplification of the control It is a known fact that a dq frame is a frame of reference which rotates along with the voltage/current vectors. Thus, all the AC quantities appear as DC quantities in this frame. This requires additional transformations and computations. Since dq transformation is not required in the present control, these additional computations can be avoided.

The use of the first and/or second inductor L1 and L2 placed in the circulating current path has the advantage of further limiting the circulating current.

There are a number of variations that are possible to make of the invention. It is for instance possible to omit the first and second inductors L1 and L2.

In the control it is possible to omit the filtering. Furthermore, the control is not limited to proportional control. It is possible with integrating control in addition to or instead of proportional control. It should also be realized that it is not necessary to combine the circulating current limitation with the ordinary control (using the modulation index). The circulating current limitation can be performed separately.

From the foregoing discussion it is evident that the present invention can be varied in a multitude of ways. It shall consequently be realized that the present invention is only to be limited by the following claims.

The invention claimed is:

1. An arrangement for limiting circulating currents in a converter converting between alternating current, AC, and direct current, DC, said converter having a number of AC and DC terminals and comprising:

a number of converter arms, where a first and a second converter arm are connected in parallel between a first DC terminal and a first AC terminal and two other converter arms are connected in parallel between a second DC terminal and the first AC terminal, each converter arm comprising a string of series-connected converter cells; and a control unit configured to:

obtain a first arm current running in the first converter arm and a second arm current running in the second converter arm sensed by current sensors in the first and second converter arms;

form an average of the two converter arm currents;

form a first error signal between the first converter arm current and the average;

form a first voltage control signal based on the average using the first error signal;

form a second error signal between the second converter arm current and the average;

form a second voltage control signal based on the average using the second error signal;

add the first voltage control signal to a modulation reference in order to obtain a first converter arm control signal;

use the first voltage control signal in the control of the voltage provided by the first converter arm comprising controlling the first converter arm using the first converter arm control signal and thereby controlling the cells of the first converter arm to provide a voltage on the AC terminal corresponding to the first converter arm control signal;

add the second voltage control signal to a modulation reference) in order to obtain a second converter arm control signal; and use the second voltage control signal in the control of the voltage provided by the second converter arm comprising controlling the second converter arm using the second converter arm control signal and thereby controlling the cells of the second converter arm to provide a voltage on the AC terminal corresponding to the second converter arm control signal.

2. The arrangement according to claim 1, wherein the control unit is configured to perform proportional control of the first error signal in order to obtain the first voltage control signal and perform proportional control of the second error signal in order to obtain the second voltage control signal.

3. The arrangement according to claim 1, wherein the control unit is further configured to filter the converter arm currents before being used.

4. The arrangement according to claim 1, further comprising at least one inductor between the first and second converter arm.

5. The arrangement according to claim 1, further comprising the converter.

6. The arrangement according to claim 2, wherein the control unit is further configured to filter the converter arm currents before being used.

7. The arrangement according to claim 2, further comprising at least one inductor between the first and second converter arm.

8. The arrangement according to claim 3, further comprising at least one inductor between the first and second converter arm.

9. The arrangement according to claim 2, further comprising the converter.

10. The arrangement according to claim 3, further comprising the converter.

11. The arrangement according to claim 4, further comprising the converter.

12. A method for limiting circulating currents in a converter converting between alternating current, AC, and direct current, DC, said converter having a number of AC and DC terminals and comprising a number of converter arms, where a first and a second converter arm are connected in parallel between a first DC terminal and a first AC terminal and two other converter arms are connected in parallel between a second DC terminal and the first AC terminal, each converter arm comprising a string of series-connected converter cells, the method being performed in a control unit of a circulating current limiting arrangement and comprising:

obtaining a first arm current running in the first converter arm and a second arm current running in the second converter arm sensed by current sensors in the first and second converter arms;

forming an average of the two converter arm currents;

forming a first error signal between the first converter arm current and the average;

forming a first voltage control signal based on the average using the first error signal;

forming a second error signal between the second converter arm current and the average;

forming a second voltage control signal based on the average using the second error signal;

adding the first voltage control signal to a modulation reference for obtaining a first converter arm control signal;

using the first voltage control signal in the control of the voltage provided by the first converter arm comprising controlling the first converter arm using the first converter arm control signal and thereby controlling the cells of the first converter arm to provide a voltage on the AC terminal corresponding to the first converter arm control signal;

adding the second voltage control signal to a modulation reference for obtaining a second converter arm control signal; and using the second voltage control signal in the control of the voltage provided by the second converter arm comprising controlling the second converter arm using the second converter arm control signal and thereby controlling the cells of the second converter arm to provide a voltage on the AC terminal corresponding to the second converter arm control signal.

13. The method according to claim 12, wherein the forming of the first voltage control signal comprises performing proportional control of the first error signal in order to obtain the first voltage control signal and the forming of the second voltage control signal comprises performing proportional control of the second error signal in order to obtain the second voltage control signal.

14. The method according to claim 12, further comprising filtering the converter arm currents before use.

15. The method according to claim 13, further comprising filtering the converter arm currents before use.

16. A computer program product for limiting circulating currents in a converter converting between alternating current, AC, and direct current, DC, said converter having a number of AC and DC terminals and comprising a number of converter arms, where a first and a second converter arm are connected in parallel between a first DC terminal and a first AC terminal and two other converter arms are connected in parallel between a second DC terminal and the first AC terminal, each converter arm comprising a string of series-connected converter cells, the computer program product comprising a non-transitory data carrier with computer program code configured to cause a control unit of a circulating current limiting arrangement to:

obtain a first arm current running in the first converter arm and a second arm current running in the second converter arm sensed by current sensors in the first and second converter arms;

form an average of the two converter arm currents;

form a first error signal between the first converter arm current and the average;

form a first voltage control signal based on the average using the first error signal;

form a second error signal between the second converter arm current and the average;

form a second voltage control signal based on the average using the second error signal;

add the first voltage control signal to a modulation reference in order to obtain a first converter arm control signal;

use the first voltage control signal in the control of the voltages provided by the first converter arm comprising controlling the first converter arm using the first converter arm control signal and thereby controlling the cells of the first converter arm to provide a voltage on the AC terminal corresponding to the first converter arm control signal;

add the second voltage control signal to a modulation reference in order to obtain a second converter arm control signal; and use the second voltage control signal in the control of the voltages provided by the second converter arm comprising controlling the second converter arm using the second converter arm control signal and thereby controlling the cells of the second converter arm to provide a voltage on the AC terminal corresponding to the second converter arm control signal.

* * * * *